R. R. JONES.
METHOD OF REMOVING TIRES FROM RIMS.
APPLICATION FILED FEB. 5, 1917.
1,385,079.
Patented July 19, 1921.
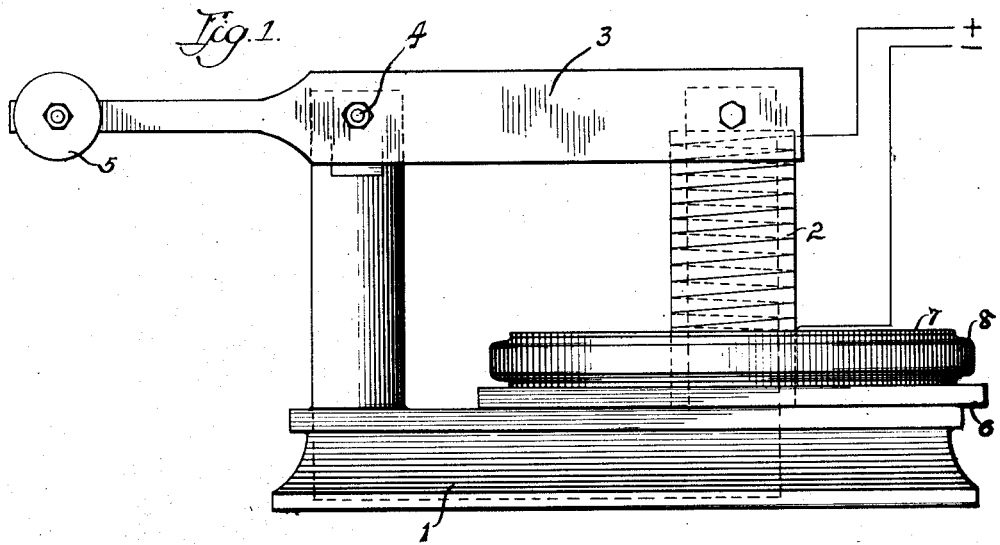
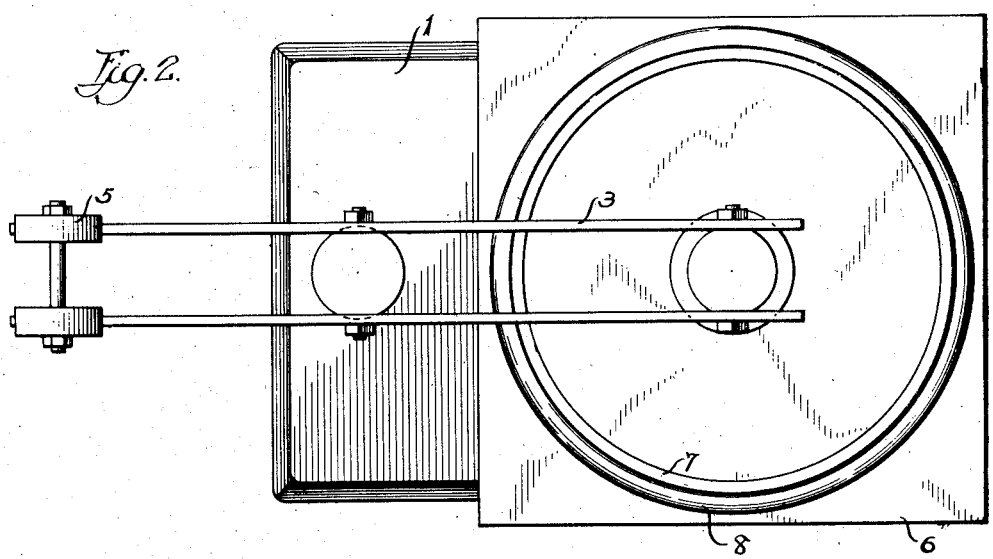
Witnesses:
Inventor.
Robert R. Jones.

UNITED STATES PATENT OFFICE.

ROBERT R. JONES, OF AKRON, OHIO, ASSIGNOR TO THE FIRESTONE TIRE AND RUBBER COMPANY, OF AKRON, OHIO, A CORPORATION OF OHIO.

METHOD OF REMOVING TIRES FROM RIMS.

1,385,079.  Specification of Letters Patent.  Patented July 19, 1921.

Application filed February 5, 1917. Serial No. 146,690.

*To all whom it may concern:*

Be it known that I, ROBERT R. JONES, a citizen of the United States, residing at Akron, in the county of Summit, State of Ohio, have invented certain new and useful Improvements in Methods of Removing Tires from Rims, of which the following is a specification.

When tires are so worn or damaged as to be unfit for further service there is always a large quantity of rubber left in the tire which is capable of regeneration or reclaiming. In the case of what are known as "hard base" tires it has been heretofore, a problem to rapidly and easily remove the tires which are vulcanized in place on the rim. The method outlined below is one which has been devised by me for quickly and easily removing the solid tires.

In the accompanying drawings is shown one method of removing the solid tires, in which—

Figure 1 is a side elevation of apparatus which may be used in carrying out the process.

Fig. 2 is a plan view of the same.

The method, broadly stated, consists in heating the rim and a small portion of the adjoining tire without heating the remainder of the tire, the heat of the rim serving to melt the rubber adjacent to it, which will be freed from the rim. The tire may then be cut at any point and easily stripped away. A convenient method of heating the rim is to pass an electric current through it, and the most economical and convenient method is by inducing an electric current through the rim.

For the purpose of carrying out the process use is made of a transformer 1, having a primary coil 2. Across the poles of the transformer there is located a hinged yoke 3, pivoted at 4 and counterweighted at 5. On the transformer there is located a platform 6 for supporting the solid tire, which consists of a continuous metal base or rim 7 and the cushion 8 which is vulcanized thereto in the well known manner. When the tire is placed in the transformer encircling the primary coil in the manner shown it will be seen that the continuous metal rim forms the secondary coil. When current is passed through the coil 2, a secondary current will be induced in the rim 7, which is soon hot enough to melt the adjacent rubber. When the rubber has melted sufficiently the tire will separate from the rim, and upon being removed from the transformer may be easily stripped from the rim.

It is obvious that changes and modifications may be made in the steps of the process as outlined above, other methods of heating the rim may be devised without altering the scope of the invention or sacrificing any of its benefits, and the process may be altered without departing from the invention as set forth in the appended claims.

Claims.

1. The method of removing a rubber tire from a rim to which it has been vulcanized, which consists in passing an electric current through the rim, whereby the rim is heated and the rubber adjacent thereto is melted, and stripping the tire from the rim.

2. The method of removing a rubber tire from a rim to which it has been vulcanized, which consists in placing the rim with the tire in the field of a primary coil, thereby inducing a current in the said rim, whereby the rim is heated and the rubber adjacent thereto is melted, and stripping the tire from the rim.

ROBERT R. JONES.